US008879780B2

(12) United States Patent
Sartor et al.

(10) Patent No.: US 8,879,780 B2
(45) Date of Patent: Nov. 4, 2014

(54) METHOD AND DEVICE FOR PROVIDING A CONTENT STREAM, CONTENT STREAM, METHOD AND DEVICE FOR PROCESSING A CONTENT STREAM

(75) Inventors: Piergiorgio Sartor, Fellbach (DE); Volker Freiburg, Stuttgart (DE)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 12/709,120

(22) Filed: Feb. 19, 2010

(65) Prior Publication Data

US 2010/0239117 A1    Sep. 23, 2010

(30) Foreign Application Priority Data

Mar. 23, 2009    (EP) .................................... 09155836

(51) Int. Cl.

| G06K 9/00 | (2006.01) |
|---|---|
| H04N 21/8358 | (2011.01) |
| H04N 21/44 | (2011.01) |
| H04N 21/2343 | (2011.01) |
| H04N 21/235 | (2011.01) |
| H04N 1/32 | (2006.01) |
| H04N 21/2389 | (2011.01) |
| G06T 1/00 | (2006.01) |
| H04N 21/435 | (2011.01) |

(52) U.S. Cl.
CPC ......... *H04N 21/435* (2013.01); *H04N 21/8358* (2013.01); *H04N 21/44008* (2013.01); *H04N 2201/3242* (2013.01); *H04N 21/2343* (2013.01); *H04N 2201/327* (2013.01); *H04N 21/235* (2013.01); *H04N 1/32144* (2013.01); *H04N 21/23892* (2013.01); *G06T 1/0021* (2013.01)
USPC ............................. 382/100; 382/232; 375/240

(58) Field of Classification Search
CPC .......... G06F 2212/7207; G06F 17/218; G06F 17/30017; H04N 9/8205; H04N 13/0066; G06T 9/00; G06T 1/0021; G06T 2201/0051; G06T 2207/20212; G06K 2209/27; G10L 19/167

See application file for complete search history.

(56) References Cited

U.S. PATENT DOCUMENTS 4,918,523 A * 4/1990 Simon et al. ............. 375/240.23
5,467,169 A * 11/1995 Morikawa ..................... 399/366

(Continued)

FOREIGN PATENT DOCUMENTS

| EP | 1 213 912 A2 | 6/2002 |
|---|---|---|
| EP | 1 648 172 A1 | 4/2006 |
| WO | WO 2007/072327 A2 | 6/2007 |

OTHER PUBLICATIONS

Peng Yin, et al., "Error Concealment Using Data Hiding", 2001 IEEE International Conference on Acoustics, Speech, and Signal Processing, XP010802945, vol. 3, May 7, 2001, pp. 1453-1456.

(Continued)

*Primary Examiner* — Manav Seth
(74) *Attorney, Agent, or Firm* — Oblon, Spivak, McClelland, Maier & Neustadt, L.L.P.

(57) ABSTRACT

The present invention relates to a method for providing a content stream (5) comprising processing information, comprising the steps of providing (S1) content data (3) comprising image and/or audio data, acquiring (S3) auxiliary data (4) from the content data (3) representing information for processing the content data (3) and embedding (S8) the auxiliary data (4) into the content data (3) thereby providing said content stream (5).

The present invention further relates to such a content stream (5) and to a device for providing such a content stream (5). Additionally, the present invention relates to a method and a device for processing a content stream (5) comprising processing information.

20 Claims, 2 Drawing Sheets

(56) References Cited

U.S. PATENT DOCUMENTS

| | | | |
|---|---|---|---|
| 6,175,639 B1 * | 1/2001 | Satoh et al. | 382/100 |
| 6,246,775 B1 * | 6/2001 | Nakamura et al. | 382/100 |
| 6,359,573 B1 | 3/2002 | Taruguchi et al. | |
| 6,411,725 B1 | 6/2002 | Rhoads | |
| 6,546,139 B1 * | 4/2003 | Kondo et al. | 382/232 |
| 6,567,531 B1 * | 5/2003 | Kondo et al. | 382/100 |
| 6,731,774 B1 * | 5/2004 | Hosaka et al. | 382/100 |
| 6,870,944 B1 * | 3/2005 | Kondo et al. | 382/100 |
| 6,965,697 B1 * | 11/2005 | Kondo et al. | 382/232 |
| 7,035,427 B2 * | 4/2006 | Rhoads | 382/100 |
| 7,239,717 B2 | 7/2007 | Fridrich et al. | |
| 7,403,633 B2 | 7/2008 | Brundage et al. | |
| 7,406,712 B2 * | 7/2008 | Kondo | 726/23 |
| 7,526,180 B2 * | 4/2009 | Itoh | 386/295 |
| 7,561,714 B2 * | 7/2009 | Tian et al. | 382/100 |
| 7,606,431 B2 * | 10/2009 | Kondo et al. | 382/233 |
| 2001/0030761 A1 * | 10/2001 | Ideyama | 358/1.9 |
| 2003/0088327 A1 | 5/2003 | Taori et al. | |
| 2004/0066736 A1 * | 4/2004 | Kroeger | 370/200 |
| 2005/0013464 A1 * | 1/2005 | Kondo et al. | 382/100 |
| 2011/0002551 A1 * | 1/2011 | Fukuma | 382/232 |
| 2011/0129116 A1 * | 6/2011 | Thorwirth | 382/100 |
| 2013/0329941 A1 * | 12/2013 | Thorwirth | 382/100 |

OTHER PUBLICATIONS

Helve Murret-Labarthe, et al, "Study of ISO/IEC 13818-1/2000/FPDAM (Carriage of metadata over MPEG-2)", Joint Video Team (JVT), XP030037025, Mar. 8, 2002, pp. 1-22.

David L. Robie, et al., "Video Error Correction Using Steganography", EURASIP Journal on Applied Signal Proceeding, vol. 2, 2002, pp. 164-173.

* cited by examiner

METHOD AND DEVICE FOR PROVIDING A CONTENT STREAM, CONTENT STREAM, METHOD AND DEVICE FOR PROCESSING A CONTENT STREAM

The present invention relates to a method and a device for providing a content stream comprising processing information. The present invention further relates to a content stream comprising processing information. The present invention additionally relates to a method and device for processing a content stream comprising processing information. Specifically, the present invention aims at an improved processing of picture, video and/or audio information.

When content data comprising image and/or audio information are processed, for example rendered by a corresponding rendering device, there are often situations where the content data need a specific processing, for example when used in motion compensated algorithms or any other types of content processing. In order to support this processing, some information needs to be extracted from the content data and processed afterwards. This extraction is however often very time consuming or computationally intensive.

The quality of content data such as picture, video or audio information is a major task in the field of content data processing. In prior art there exist various solutions for improving the processed content data.

Document WO 2007/072327 A2 proposes to synchronize a content stream with scripts to output a sensory effect by embedding a clock value as watermark into the stream. In this document, however, a sensory effect is triggered by the corresponding clock value within the stream. With this application the processed content data as such are not changed.

Document U.S. Pat. No. 7,239,717 discloses the reversible steganographic embedding of data into an image, where the original image can be restored at the receiver side after read out and removal of the embedded data. This document is related to the problem of restoring the original image and provides no possibility how to apply a picture processing, i.e. a change to the content data when being processed.

It is therefore the object of the present invention to improve the prior art. It is further the object of the present invention to reduce the problems posed by the prior art.

Specifically, the present invention has the object to present a method and a device as well as a content stream enabling the improvement of processed content data in an effective and easy way.

The above object is achieved by features of the independent claims.

The present invention relates to a method for providing a content stream comprising processing information, comprising the steps of providing content data comprising image and/or audio data, acquiring auxiliary data from the content data representing information for processing the content data and embedding the auxiliary data into the content data thereby providing said content stream.

The present invention further relates to a device for providing a content stream comprising processing information, comprising content providing means for providing content data comprising image and/or audio data, acquiring means for acquiring auxiliary data from the content data representing information for processing the content data and embedding means for embedding the auxiliary data into the content data thereby providing said content stream.

The present invention further relates to a content stream comprising processing information, comprising content data comprising image and/or audio data and auxiliary data embedded into content data, said auxiliary data representing information for processing the content data.

The present invention further relates to a method for processing a content stream comprising processing information, comprising the steps of receiving a content stream comprising content data comprising image and/or audio data and auxiliary data embedded into the content data, said auxiliary data representing information for processing the content data, extracting the auxiliary data from the content stream and processing the content data in accordance with the auxiliary data.

The present invention further relates to a device for processing a content stream comprising processing information, comprising a receiving means for receiving a content stream comprising content data comprising image and/or audio data and auxiliary data embedded into the content data, said auxiliary data representing information for processing the content data, extracting means for extracting the auxiliary data from the content stream and content processing means for processing the content data in accordance with the auxiliary data.

Additional advantages, features and embodiments are defined in the dependent claims.

Further features, advantages and objects of the present invention will become evident by means of the figures of the enclosed drawings as well as by the following detailed explanation of illustrative-only embodiments of the present invention.

Figure 1:
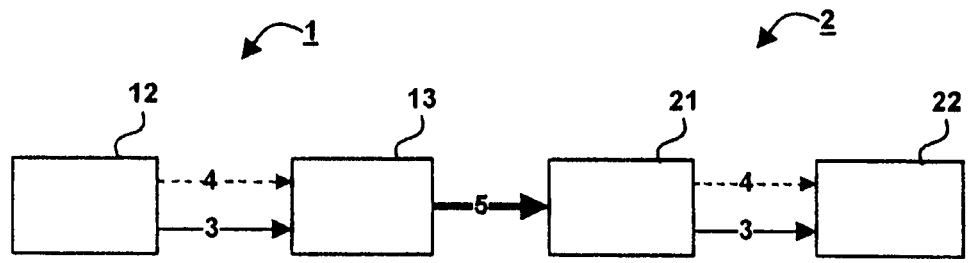
FIG. 1 shows a schematic block diagram of an end-to-end signal chain.

FIG. 1 shows a schematic block diagram of a typical end-to-end signal chain. A content providing means 12 provides content data comprising image and/or audio data. The content data within the meaning of the present invention are intended to refer to still or moving pictures, videos or audio. The content providing means 12 can for example comprise any device which enables the production of content data.

The distribution of the content data is accomplished by the delivery means 13. The delivery means can be based on different types of broadcasting, IPTV, packaged media, any type of storage including CD-ROM, DVD, Blu-ray Disc™ or any other type of wired or wireless transmission.

The content providing means 12 and the delivery means 13 can be integrated into one single device or can be provided as separate devices. The content providing means 12 and the delivery means 13 are referred to as the content stream providing side 1.

The content data are then delivered to and received on the content stream processing side 2 by a receiving means 21 which can be a tuner, a set-top-box, a packaged media player, e.g. HD/DVD player, Blu-ray Disc Player, or the like. The content data then by a content processing means 22 are processed, for example they are reproduced or rendered by a corresponding display and/or audio render device. The receiving means 21 and the content processing means 22 can likewise be integrated into one single device or can be provided as separate devices.

The present invention is not limited to the system shown in FIG. 1 but can be applied to any system having a content stream providing side 1 which transmits content data to a content stream processing side 2, which processes the content data.

Usually, one or more devices on the content stream processing side 2 for processing the content data properly need to extract information from the content data in order to be able to process it properly. Sometimes this information is difficult to derive or it is time-consuming and/or computationally heavy.

The present invention therefore proposes to extract the processing information needed for properly processing the content data on the content stream providing side 1 prior to the delivery of the content data and to submit the pre-acquired and pre-calculated data together with the content data as content stream. The present invention further proposes, that on the content stream processing side 2 the pre-acquired and pre-calculated data are extracted from the content and used for properly processing the content data.

This is also schematically shown in FIG. 1. The content data 3 are in any case transmitted from the content providing means 12 to the delivery means 13. The connection between the content providing means 12 and the delivery means can be assumed as reliable. Optionally, depending on the embodiment, as will be explained later, auxiliary data 4 representing information for processing the content data 3 are also submitted from the content providing means 12 to the delivery means 13. The auxiliary data are then embedded into the content data 3 thereby providing the content stream 5 which is then delivered from the content stream providing side 1 to the content stream processing side 2.

The content stream 5 thus comprises the content data 3 comprising the image and/or audio data and the content stream 5 additionally comprises the embedded auxiliary data 4 comprising information for processing the content data 3 on the content stream processing side 2.

The content stream 5 is received by the content stream processing side 2 and either in the receiving means 21 and/or in the content processing means 22 the auxiliary data 4 are extracted from the content data 3 and the content data 3 are then processed in accordance with the information contained in the auxiliary data 4. The connection between the receiving means 21 and the processing means 22 is usually also a reliable connection, e.g. a high-bandwidth, lossless, digital connection such as HDMI or the like.

The connection between the content stream providing side 1 and the content stream processing side 2 however will be less reliable due to transmission losses that might occur with reception of broadcast, within an IPTV or any other network, or while reading a packaged media like CD-ROM, DVD or Blu-ray Disc™.

Depending on the type and reliability of the different connections between the involved devices, the process of embedding the auxiliary data 4 can be changed and adapted accordingly.

Figure 2:
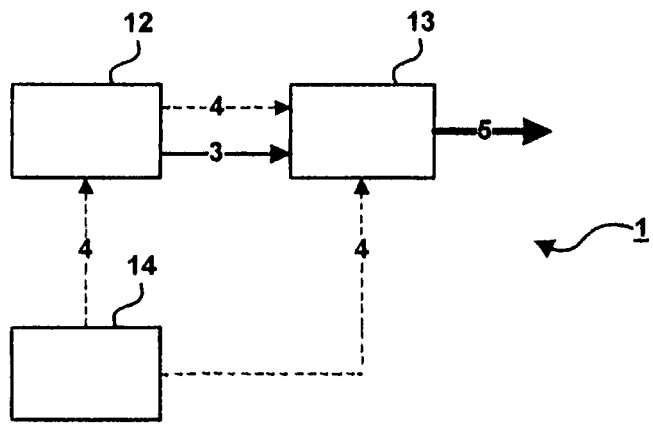
FIG. 2 shows a schematic block diagram of a content stream providing side.

FIG. 2 shows an embodiment of the content stream providing side 1. On the content stream providing side 1 an acquiring means 14 is provided, to which the content data 3 are delivered and which processes the content data 3 in order to acquire the auxiliary data 4. The acquiring means 14 then submits the auxiliary data 4 to the content providing means 12 and/or to the delivery means 13. One or both of the content providing means 12 and the delivery means 13 then embed the auxiliary data 4 into the content data 3 so that the delivery means 13 then can deliver the final content stream 5.

Hereby the content providing means 12 can embed all or a part of the auxiliary data 4 into the content data 3 and then submit the already embedded auxiliary data together with the remaining auxiliary data to the delivery means 13, which then in turn embeds the remaining auxiliary data 4. Alternatively, the content providing means 12 can completely embed the auxiliary data 4 into the content data 3 and transmit the readily prepared content stream 5 to the delivery means 13.

Figure 3:
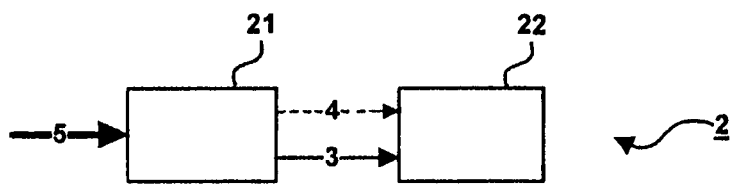
FIG. 3 shows a first embodiment of a content stream processing side.

FIG. 3 shows a first embodiment of the content stream processing side 2. In this embodiment, the receiving means 21 receives the content stream 5 and extracts the auxiliary data 4 from the content data 3. The receiving means 21 then submits the content data 3 as well as the extracted auxiliary data 4 to the content processing means 22, which then processes the content data 3 in accordance with the information comprised in the auxiliary data 4.

Figure 4:
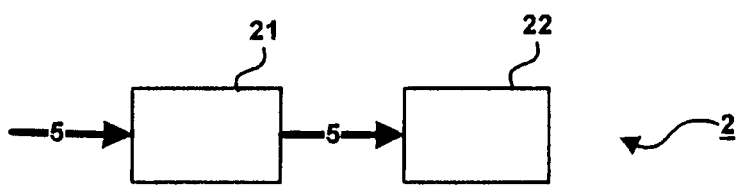
FIG. 4 shows a second embodiment of a content stream processing side.

FIG. 4 shows an alternative embodiment of the content stream processing side 2. In this embodiment the receiving means 21 receives the content stream 5 and transmits the content stream 5 to the content processing means 22, which then extracts the auxiliary data 4 from the content data 3. In a further alternative embodiment (not shown in the figures), the receiving means 21 can only extract a part of the auxiliary data 4 and the content processing means 22 can extract the remaining auxiliary data 4.

In a preferred embodiment the auxiliary data 4 are embedded into the content data 3 in such a way that they are imperceptible. That means that the auxiliary data 4 by a viewer and listener are not perceived, even though they are present. The auxiliary data 4 are thus not visible nor audible to a user when the content data 3 are processed. This applies to every type of processing, i.e. the auxiliary data 4 are imperceptible when the processing side 2 is capable to extract and use them for processing as well as in the case where the processing side 2 is not capable of extracting and using the auxiliary data 4.

That means that the auxiliary data 4 provide a possibility to enhance the quality of the processed content data 3, but in case that a content stream processing side 2 is not able to extract and process the auxiliary data 4, the processing of the content data 3 is not prevented but has the quality it would have without the auxiliary data 4.

In a very preferred embodiment the auxiliary data are embedded as imperceptible watermark or steganographic data.

The process of embedding a watermark into digital data is known in prior art and therefore will not be further explained.

An important advantage of the present invention is that due to the type of embedding the size of the transmitted content stream 5 is not changed and so the transmission of the content stream 5 according to the present is independent of the used transmission channel and intermediate processing steps.

To make the process clearer, in the following several examples will be given. The auxiliary data 4 are embedded into the content data 3 during either content production, e.g. within the content providing means 12, or before content distribution, e.g. accomplished by the delivery means 13. Similarly, the decoding, i.e. the extracting of auxiliary data 4 can be performed in the receiving means 21, the content processing means 22 or both.

This enables also scenarios, where only one of the two devices on the content stream processing side 2 is capable to decode, i.e. extract the auxiliary data 4, or where the interpretation of the auxiliary data 4 is distributed between receiving means 21 and content processing means 22, e.g. between receiver and render device.

An example for the later case is to have the receiving means 21 performing an interlace-to-progressive conversion (IPC), while the content processing means 22, e.g. a display device, performs the MC-FRC operation. The receiving means 21 therefore interprets measurement data or playback instruction related to IPC, while the content processing means 22 interprets MC-FRC related auxiliary data 4 only. In order to ensure that MC-FRC related auxiliary data 4 successfully reach the content processing means 22, the data have to be embedded in a way that it will survive the IPC operation of the base content stream signal. This can be done in the modulation or transport layer, e.g. by replication of auxiliary data 4 on odd and even video scan lines.

Embodiments of the solution can vary broadly depending on the specific use case. Common to all embodiments are certain layers of the transport protocol for the auxiliary data 4 that should be conveyed with the content data, i.e. the image and/or or audio information.

These layers can be categorized into the modulation layer, the transport or packet layer and the application or presentation layer. The different options when defining the respective layers will be explained in the following.

First, the modulation layer will be explained. It defines how the content data 3 as a carrier signal are, preferably imperceptibly, modulated by a digital bit stream with the auxiliary information. The modulation method has to be chosen from a set of available or know methods ranging from very robust but low data rate to less robust but high data rate. In general, the modulation method can be categorized into methods that embed auxiliary data 4 either in the uncompressed or compressed domain. When content is distributed digitally, it is typically preferable to use a compressed domain, e.g. by directly modifying DCT coefficients in a MPEG stream. The auxiliary data 4 preferably are embedded as watermark or steganographic data.

Now, the Transport or Packet Layer will be explained: It defines the format how the bit stream or content stream 5 is organized into data units, which are optionally compressed, and/or optionally encrypted, and/or optionally supplemented with redundant data to allow for error correction within the bit stream. Typically, more redundant data will be used in this layer, if the chosen data modulation is less robust, and vice versa.

Finally, the Application or Presentation Layer will be explained: It defines the contents and/or interpretation of conveyed auxiliary data 4. This data can be categorized into measurement data and playback instruction data.

The first category conveys video or audio properties that are known during content production time or could be measured from the resulting video or audio stream. In the later case, having this data pre-measured saves the content stream processing side 2 from computing the data on his own, thus reducing complexity and/or effort required on the content stream processing side 2. On content stream processing side 2, this data is interpreted to positively influence playback processing.

The second category goes one step further by moving the interpretation step from content stream processing side 2 to content stream providing side 1, and then forwarding the interpretation result as a playback instruction to the content stream processing side 2. This approach is typically beneficial when the amount of measurement data is larger than the size of just the playback instruction, allowing for data reduction and therefore choice of a more robust data encoding in the lower layers. Another positive aspect could be the reduced complexity at the content stream processing side 2, because the data interpretation is already performed with the content production.

Further aspects of the first category of auxiliary data 4 can be elaborated as follows. Sometimes, stream properties can be measured from the stream, but the playback requires to have this information beforehand, e.g. the peak audio level needs to be known in order to limit volume/audio gain adjustment which avoids amplitude clipping. Of most interest is measurement data that is measurable during content production, but impossible to determine correctly from the stream at the receiver side.

One example is to know the proper video mode and phase information for each frame in the stream. Such information can be determined only when the content has enough differences between motion phases, which is typically not the case for a motion scene following a still picture scene. Wrong information here leads usually to a perceivable distortion of the motion portrayal, when such a scene is converted e.g. from 24 motion phases per second (film, movie) to 60 motion phases per second (video).

Another example is to know the motion of the depicted content at the border of the image frame. The usual way to obtain the motion information is to correlate image areas between two successive frames, where the spatial displacement of these areas define their motion. However, the correlation will fail at the image border, because the content is visible in only one frame, but not in the other. But this information could be available during content production, especially in case of film material, where a larger picture of the scene is shot, with the overscan area later being removed during post-production. In this case the correlation at the border area could be performed before overscan removal, and saved in the auxiliary data.

Further information that could be of interest in the video domain are as non-limiting examples content events, like e.g. a scene change (cut), scene blending/fading or transparent overlay of two different camera shots, the presence and amount of flash lighting, etc. Favorably, such content events are announced a specific number of frames before with a count-down in each frame until the event, so that the robustness against transport loss is increased. Also, the playback method can be adjusted symmetrically around the time of the event to e.g. allow for smooth transition between methods instead of hard switching.

One example for the application of the second category of auxiliary data is the control of the interpolation method in a motion-compensated frame rate conversion (MC-FRC) system. A MC-FRC changes the frame rate of a video sequence by inserting additional frames which are interpolated from temporally adjacent original frame using motion information. Such motion information is usually estimated from at least two temporally adjacent original frames, using e.g. a correlation approach. The quality of such motion information typically ranges from very good for simple motion situations like a panning scene to very bad in complex motion situation with many objects in the scene moving in divergent direction, and/or with high speed, and/or with many mutual occlusions. For the choice of the interpolation method it is therefore advisable to scale the properties of such method according to the quality of the motion information, i.e. to use a very precise interpolation method which retains picture sharpness in simple motion situations versus a very robust interpolation method in complex motion situations to reduce the amount of picture artifacts due to erroneous motion information.

There might be use cases where the requirement of imperceptible modulation might be relaxed to nearly imperceptible modulation if the application of the auxiliary data 4 is able to restore the carrier signal in addition to the intended display processing.

Another aspect that influences the protocol definition across all three layers is the hierarchy of importance inherent to the data set. Obviously, some auxiliary data 4 are more important than other in order to improve the playback of the content data 2 on the content stream processing side 2. In other words, the loss of more important auxiliary data 4 would result in a stronger perceivable degradation during processing. For example, the information about global properties like the frame luminance level, the current video mode, or a playback instruction for the interpolation method impacts the portrayal of the full image frame or sequence, while information about only local parts of the picture or one-time events will analogously impact the perceived quality less severely. As a consequence, important auxiliary data 4 should be embedded by using a more robust modulation method and/or with higher redundancy in the transport layer, so that this data has a higher chance of survival on the end-to-end connection between content production and processing.

In one embodiment the present invention therefore proposes to define a priority for different types of auxiliary data 4 and to define the modulation and/or the format and/or the use of the auxiliary data 4 in accordance with the defined priority.

It is to be noted, that the step of defining a priority is optional and can also be omitted. The modulation and/or format and/or use of the auxiliary data 4 can be defined in accordance with pre-set parameters, in accordance with the type of transmission lines between the involved devices or the like.

Figure 5:
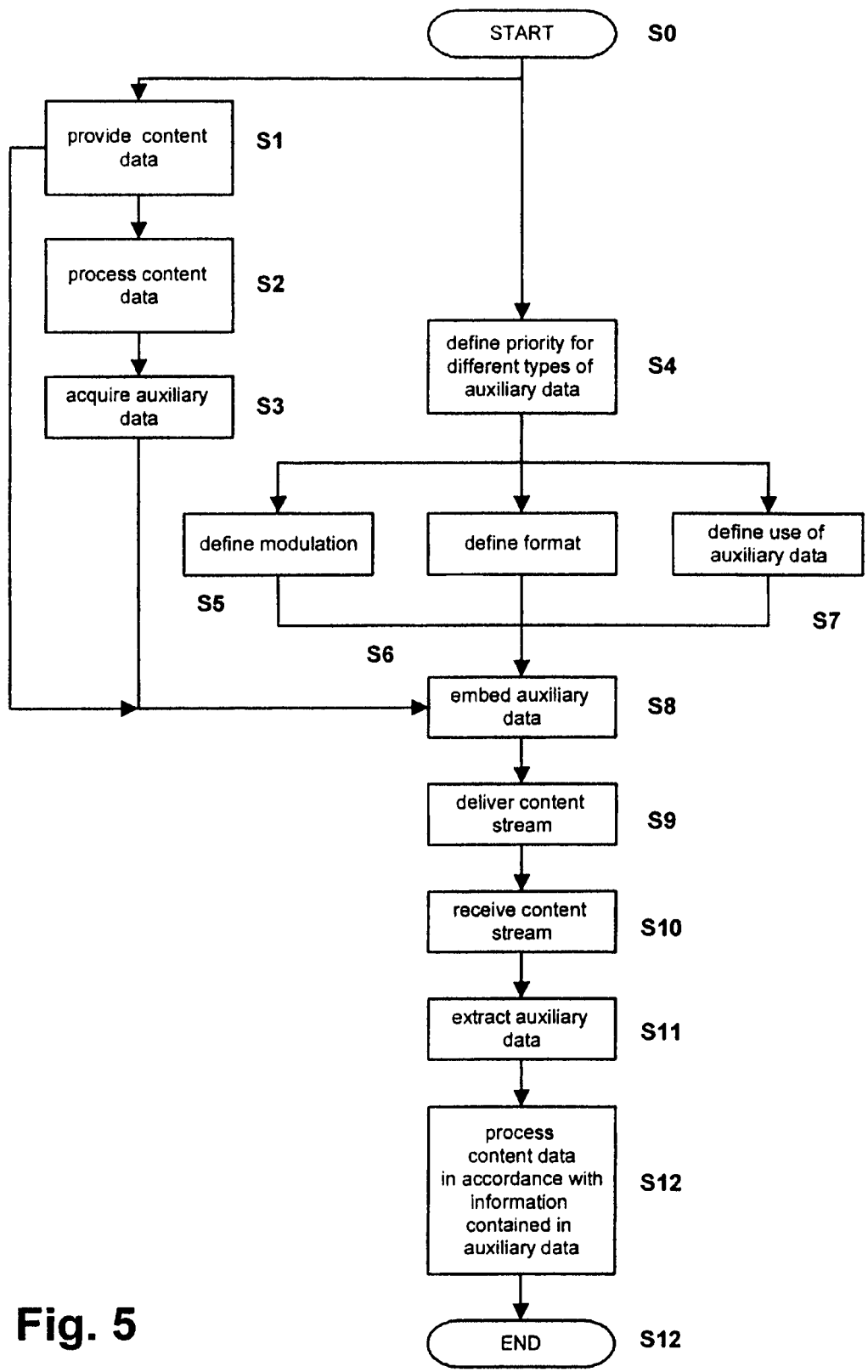
FIG. 5 shows a flow chart showing the steps according to the method of the present invention.

FIG. 5 shows a flow chart of a method according to the present invention. The process starts in step S0. In the first step S1 content data are provided, e.g. by producing the content data. In the following step S2 the content data are processed by the acquiring means 14 and in step S3 the acquiring means 14 acquires the auxiliary data 4. It is however clear that the acquisition of the auxiliary data 4 can be accomplished in several separated steps which can also be carried out by different means at different stages of the content production. The content data after step S1 as well as the auxiliary data 4 after step S3 are then provided to an embedding means which in step S8 embeds the auxiliary data 4 into the content data 3.

Before, parallel or after to the steps S1 to S4, optionally, a priority for different types of auxiliary data 4 can be defined. For example, as previously described, the importance of different parts or types of auxiliary data can be determined. The importance hereby is dependent on the necessity of the respective auxiliary data being present for properly processing the content data 3 on the content stream processing side 2.

Depending on the defined priorities then the modulation method, the data format and/or the use of the auxiliary data can be defined in the following steps S5, S6 and S7. However, the modulation, the format and the use of auxiliary data can also be defined independent of priorities.

As previously described, the modulations scheme in step S5 can be defined dependent on the type of auxiliary data, so that more important auxiliary data can be transmitted with a more robust modulation scheme. Likewise, the data format can be defined dependent on the priority of the auxiliary data or in case no priority is present dependent on other parameters set either by the content stream providing side or dependent on the application intended on the content stream processing side 2.

In step S4 for example the time and way how to use the auxiliary data 4 on the content stream processing side 2 can be defined.

However, each of the steps S4, S5, S6 and S7 is optional. In any case in step S8 the auxiliary data 4 are embedded into the content data 3.

In the following step S9 the content stream 5 is delivered and in step S10 received by the content stream processing side 2. In the following step S11 on the content stream processing side 2 as previously described, the auxiliary data 4 are extracted and in the following step S12 the content data 3 are processed in accordance with the information contained in the auxiliary data 4.

The process ends in step S12.

In the following an example scenario will be explained. After a movie receives the final cut, it may go through some off-line processing where information like global motion, scene change, brightness, contrast, sharpness level and changes and the like are calculated. This information is then embedded into the content data, whereby it is optionally compressed, encrypted and inserted back into the content data as watermark or steganographic data. Once the movie is broadcast or distributed by other means, like DVD or Blu-ray Disc, it carries always the pre-calculated auxiliary data. A TV set or a set-top-box receiving such a movie with the capability to detect and decode the auxiliary data 4, can use the embedded information in order to support better its internal picture improvement processing units and consequently deliver a better user experience.

The present invention therefore provides a method of simplifying the processing of content data 3 but at the same time maintaining the possibility of a high quality. Further, in the preferred embodiment the auxiliary data 4 are not visible and/or audible, so that any type of receiving means 21 and/or content processing means 22 is capable to process the content data 3 even when not using the auxiliary data 4.

The present invention thus provides an improvement in quality of content data processing by providing pre-determined, different to calculate information together with the content data 3. The present invention thus provides a very unified solution, which is independent from the transport channel and from intermediate processing and which supports features for advanced quality improvement.

The invention claimed is:

1. A method for providing a content stream comprising processing information, comprising the steps of:
    providing content data comprising image and/or audio data,
    acquiring auxiliary data from the content data representing information for processing the content data and
    embedding, via a processor, the auxiliary data into the content data thereby providing said content stream,
    wherein the content data of the content stream is capable of being processed to reproduce the image and/or audio data without using the auxiliary data.

2. The method according to claim 1, comprising the step of embedding the auxiliary data in such a way that they are imperceptible.

3. The method according to claim 1 or 2, comprising the step of embedding the auxiliary data as imperceptible watermark or steganographic data.

4. The method according to claim 1, comprising the step of acquiring as auxiliary data measurement data indicating image and/or audio properties of the content data.

5. The method according to claim 1, comprising the step of acquiring as auxiliary data processing instruction data comprising instructions how to process the content data.

6. The method according to claim 1, comprising the steps of:
    defining a priority for different types of auxiliary data and
    embedding the types of auxiliary data in accordance with the defined priority.

7. The method according to claim 6, comprising the steps of:
    embedding the auxiliary data by modulating the auxiliary data onto the content data and defining the modulation scheme for each type of auxiliary data in accordance with the defined priority.

8. The method according to claim 6 or 7, comprising the steps of:
defining the format for each type of auxiliary data in accordance with the defined priority,
preferably defining whether to provide a compression step and/or an encryption step and/or redundant data for error correction.

9. The method according to claim 6, comprising the step of defining in accordance with the defined priority the time and/or way of use of the types of the auxiliary data when processing the content data.

10. A device for providing a content stream comprising processing information, comprising:
circuitry configured to:
provide content data comprising image and/or audio data,
acquire auxiliary data from the content data representing information for processing the content data and
embed the auxiliary data into the content data thereby providing said content stream,
wherein the content data of the content stream is capable of being processed to reproduce the image and/or audio data without using the auxiliary data.

11. A content stream embodied in a non-transitory medium comprising processing information, comprising:
content data comprising image and/or audio data and auxiliary data embedded into the content data, said auxiliary data representing information for processing the content data,
wherein the content data of the content stream is capable of being processed to reproduce the image and/or audio data without using the auxiliary data.

12. The content stream according to claim 11, wherein the auxiliary data are imperceptible.

13. The content stream according to claim 11 or 12, wherein the auxiliary data are embedded as imperceptible watermark or steganographic data.

14. A method for processing a content stream comprising processing information, comprising the steps of:
receiving a content stream comprising content data comprising image and/or audio data and auxiliary data embedded into the content data, said auxiliary data representing information for processing the content data,
extracting the auxiliary data from the content stream and
processing, via a processor, the content data in accordance with the auxiliary data,
wherein the content data of the content stream is capable of being processed to reproduce the image and/or audio data without using the auxiliary data.

15. A device for processing a content stream comprising processing information, comprising:
circuitry configured to:
receive said content stream comprising content data comprising image and/or audio data and auxiliary data embedded into the content data, said auxiliary data representing information for processing the content data,
extract the auxiliary data from the content stream and
process the content data in accordance with the auxiliary data,
wherein the content data of the content stream is capable of being processed to reproduce the image and/or audio data without using the auxiliary data.

16. A device for providing a content stream comprising processing information, comprising:
means for providing content data comprising image and/or audio data,
means for acquiring auxiliary data from the content data representing information for processing the content data and
means for embedding the auxiliary data into the content data thereby providing said content stream,
wherein the content data of the content stream is capable of being processed to reproduce the image and/or audio data without using the auxiliary data the auxiliary data includes data determinable from the content data of the content stream.

17. A device for processing a content stream comprising processing information, comprising:
means for receiving a content stream comprising content data comprising image and/or audio data and auxiliary data embedded into the content data, said auxiliary data representing information for processing the content data,
means for extracting the auxiliary data from the content stream and
means for processing the content data in accordance with the auxiliary data,
wherein the content data of the content stream is capable of being processed to reproduce the image and/or audio data without using the auxiliary data.

18. A non-transitory medium storing a program which when executed causes a computer to perform the steps of:
providing content data comprising image and/or audio data,
acquiring auxiliary data from the content data representing information for processing the content data and
embedding the auxiliary data into the content data thereby providing said content stream,
wherein the content data of the content stream is capable of being processed to reproduce the image and/or audio data without using the auxiliary data the auxiliary data.

19. A non-transitory medium storing a program which when executed causes a computer to perform the steps of:
receiving a content stream comprising content data comprising image and/or audio data and auxiliary data embedded into the content data, said auxiliary data representing information for processing the content data,
extracting the auxiliary data from the content stream and
processing the content data in accordance with the auxiliary data,
wherein the content data of the content stream is capable of being processed to reproduce the image and/or audio data without using the auxiliary data the auxiliary data.

20. The method according to claim 6, wherein each priority of the different types of auxiliary data is set based upon perceivable degradation during processing of the content data.

* * * * *